United States Patent [19]
Sonoda

[11] Patent Number: 5,494,361
[45] Date of Patent: Feb. 27, 1996

[54] COLOR IMAGE RECORDING METHOD

[75] Inventor: Yasuko Sonoda, Saitama, Japan

[73] Assignee: Fuji Photo Film Co., Ltd., Kanagawa, Japan

[21] Appl. No.: 179,696

[22] Filed: Jan. 11, 1994

[30] Foreign Application Priority Data

Jan. 11, 1993 [JP] Japan ................................. 5-002906

[51] Int. Cl.$^6$ ................................................ B41J 2/355
[52] U.S. Cl. ............................. 400/120.07; 400/120.02; 400/120.03; 347/177
[58] Field of Search ...................... 400/120.04, 120.05, 400/120.06, 120.08, 120.09, 120.1, 120.18, 120.01, 120.02, 120.03, 120.04, 120.07; 346/76 PH; 345/102, 104; 347/72, 175

[56] References Cited

U.S. PATENT DOCUMENTS

| | | |
|---|---|---|
| 4,989,138 | 1/1991 | Radochonsiki ........................... 364/200 |
| 5,016,191 | 5/1991 | Radochonski ............................. 400/83 |
| 5,167,456 | 12/1992 | Murakoshi et al. ............... 400/120.02 |
| 5,206,707 | 4/1993 | Ott .......................................... 356/402 |
| 5,297,878 | 3/1994 | Saito et al. ......................... 400/120.02 |

*Primary Examiner*—John S. Hilten

[57] ABSTRACT

A half tone color image recording method is provided in which picture cells of a same main scanning line are staggered such that every second picture cell is shifted in a sub scan direction orthogonal to the main scan direction in one or two of three colors. Simultaneously, in the other two colors or in a remaining one color, every second picture cell group consisting of two adjacent picture cells of the same main scanning line is shifted in the sub scan direction. The amount of staggering or shifting corresponds to a half length of the picture cells in the sub scan direction.

29 Claims, 8 Drawing Sheets

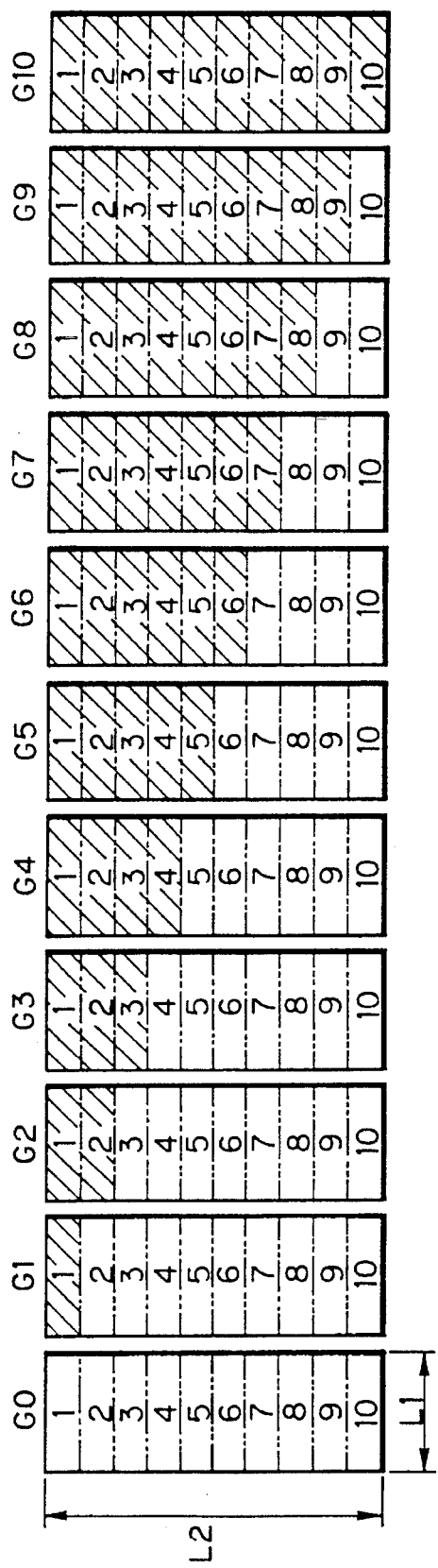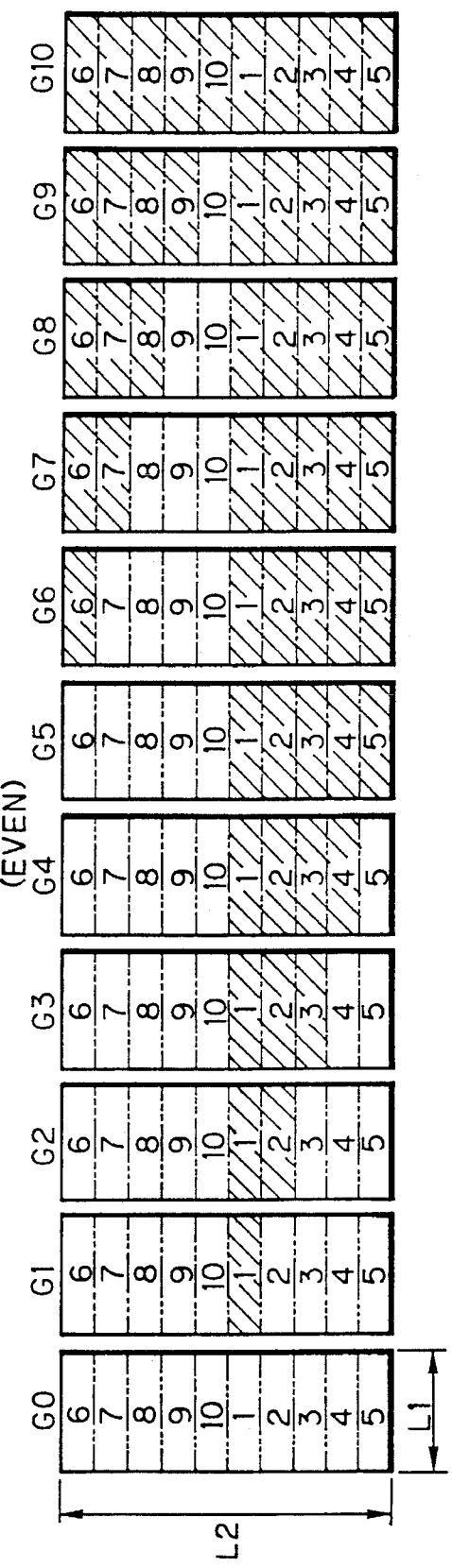

COLOR IMAGE RECORDING METHOD

BACKGROUND OF THE INVENTION

1. Field of the Invention

The present invention relates to a method of recording a full-color half tone image, and more particularly to a thermal wax transfer type color half tone printing method which provides improvements in preventing color moire and changing of hue caused by a miss registration of colors.

2. Related Art

A color thermal printing method, color ink jet printing method, color electrophotographic recording method and so forth are known as color image recording methods. The color thermal printing method includes a direct color thermal printing method wherein a color thermosensitive recording medium is directly heated to record an image thereon, and a thermal transfer printing method. The thermal transfer printing method includes a thermal wax transfer type printing method and a sublimation type printing method. With the thermal wax transfer type printing method, the back surface of an ink film is heated with a thermal head, and melted or softened ink is transferred to a recording paper. With the sublimation type printing method, dye is sublimated into an image reception layer of the recording paper.

In the thermal wax transfer type printing method, a half tone image is reproduced by using a plurality of heating elements disposed in a main scan direction and by changing the length of the dot recording area in a sub scan direction orthogonal to the main scan direction within a virtual rectangular picture cell. The picture cells have the same size and are arranged in a matrix. Therefore, a plurality of rectangular ink dots form a line extending in the main scan direction in the conventional half tone wax transfer type printing method. Depending upon the pattern included in an original, a plurality of conspicuous parallel lines extending in the main scan direction are included in the printed image, which often appears as moire.

In printing a full-color image by using the half tone wax transfer type printing method, a plurality of ink dots of three primary colors, yellow, magenta and cyan, are superposed one upon another on a recording paper so that the recorded ink dots form a full-color half tone image through a subtractive mixture. Because the size of a picture cell is very small, for example, 125×125 µm, and because the recording paper is moved relative to the thermal head in the sub scan direction during the recording, a color registration error, that is, an alignment error between three color separation image frames of a full-color image may easily occur. As a result of such a color registration error, the hue of the full-color image may be quite changed from the original or may have color blur.

To prevent the moire and the change in hue of the image caused by a registration error, a recording method has been suggested, for example, in U.S. patent application Ser. No. 08/024,813 filed on Mar. 14, 1993, wherein the lengths of picture cells in the sub scan direction are changed between cyan and magenta, as conspicuous colors. Also every two cyan picture cells adjacent in the main scan direction are staggered or offset from each other by half the length of the cyan picture cell in the sub scan direction. Also, for the magenta picture cells, every two picture cells adjacent in the main scan direction are staggered or offset from each other by half the length of the magenta picture cell in the sub scan direction However, if the registration of colors fails in this method, the same color patterns cyclically take place in two adjacent columns extending in the sub scan direction. Such color patterns lower the quality of the image rather than prevent a change of hue or color moire.

As an improvement of the just described method, the applicant of the present invention suggests a method wherein the length of the picture cells of two of the three colors in the sub scan direction is twice as long as the length of the picture cell of the one remaining color in the sub scan direction, and the respective positions for the three colors of picture cells adjacent in the main scan direction are shifted or staggered by half the length of the respective picture cells in the sub scan direction.

However, the improved method still has a problem in that gradation of the one of the three colors is reduced so that it is difficult to reproduce a well balanced gray scale.

SUMMARY OF THE INVENTION

In view of the foregoing, a primary object of the present invention is to provide a method of recording full-color half tone images in which a general hue of a printed image is kept unchanged even if a failure of color registration occurs, without reducing any color gradation.

To achieve the above and other objects, according to a method of the present invention, picture cells of a same main scanning line are staggered such that every second picture cell is shifted in a sub scan direction orthogonal to the main scan direction in one or two of three primary colors. Simultaneously, in the other two colors or in a remaining one color, every second picture cell group consisting of two adjacent picture cells of the same main scanning line is shifted in the sub scan direction. The amount of staggering or shifting corresponds to a half length of the picture cells in the sub scan direction.

By recording ink dots in the picture cells arranged as described above, even if any color registration error occurs in the main scan direction as well as in the sub scan direction, the general hue of the reproduced image is kept unchanged to the naked eyes of a human being because the relationship of complementary colors is maintained in total.

BRIEF DESCRIPTION OF THE DRAWINGS

Other objects and advantages of the present invention will become apparent in the following detailed description of the preferred embodiments when read in connection with the accompanying drawings, wherein like reference numerals designate like or corresponding parts throughout the several views, and wherein:

FIGS. 5A and 5B are illustrative of another embodiment of the invention, in which a general hue of a printed image is kept unchanged by maintaining a compensatory coloring even when there is a shear of color registration;

DETAILED DESCRIPTION OF THE EMBODIMENTS

Figure 1:
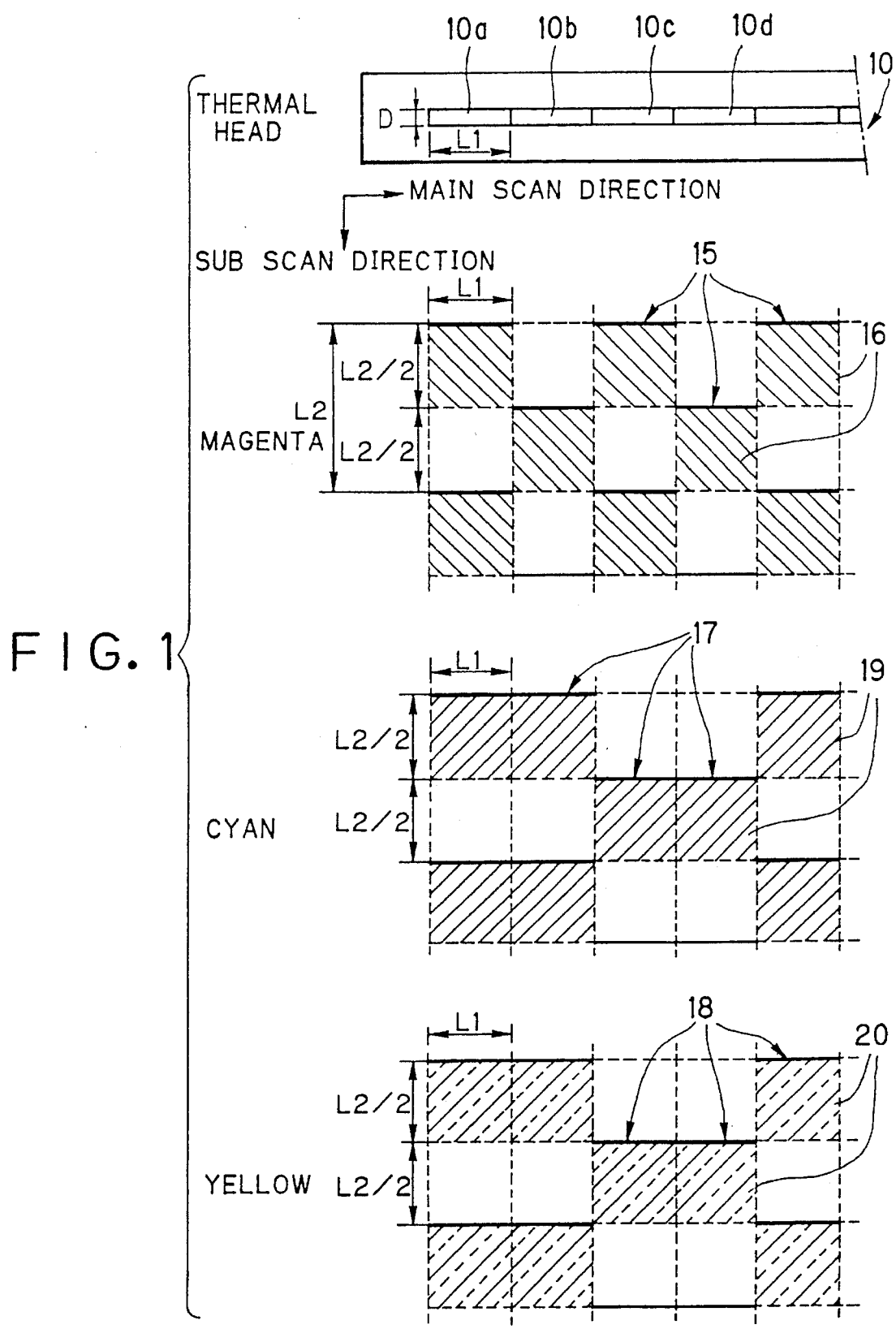
FIG. 1 is illustrative of an embodiment in which a general hue of a printed image is kept unchanged by maintaining a compensatory coloring even when there is a shear of color registration, and is illustrative of a thermal head and states of recording ink dots in cyan, magenta and yellow picture cells at a dot percent of 50%.
Figure 2:
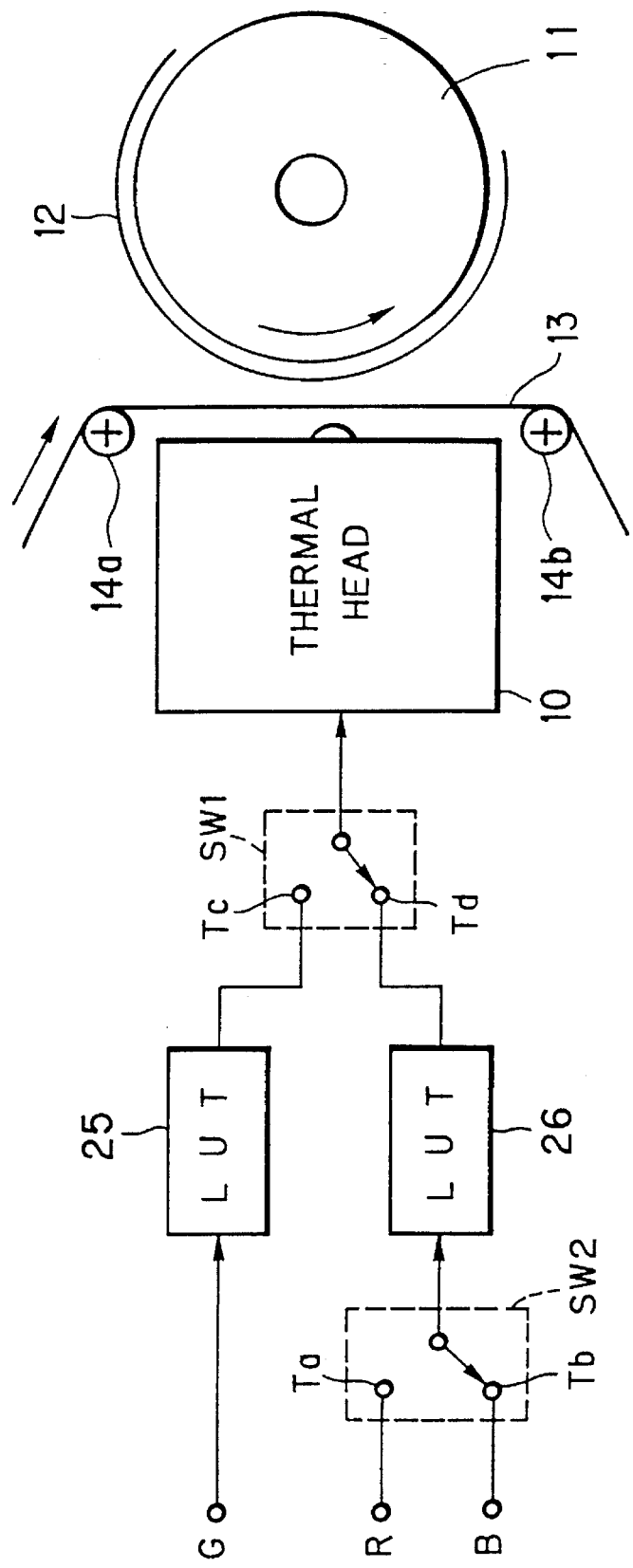
FIG. 2 is a schematic view illustrating a thermal printer for practicing the embodiment as illustrated in FIG. 1.

As shown in FIG. 1, a thermal head 10 is constituted of a plurality of heating elements 10a, 10b, 10c, ... aligned in the main scan direction to be an array. Each of the heating elements 10a etc. is rectangular, and has a length of L1 in the main scan direction and a range of D in the sub scan direction. L1 is for example, 125 µm, and D is 25 µm. As illustrated in FIG. 2, the heating element array of the thermal head 10 is arranged to be parallel to the axis of a platen drum 11. Recording paper 12 is mounted on the outer surface of the platen drum 11, and is rotated intermittently at a constant pitch in the sub scan direction as indicated by the arrow. An ink film 13 is arranged between the recording paper 12 and the thermal head 10, guided by guide rollers 14a and 14b, and moved in the sub scan direction together with the recording paper 12. The ink film 13 is provided with a cyan, magenta and yellow ink areas in cyclic fashion at constant intervals. The recording paper 12 and the ink film 13 are superposed together in tight contact, and moved in the sub scan direction relative to the thermal head 10. The thermal head 10 heats the back of the ink film 13, in order to transfer the ink, as melted or softened, to the recording paper 12. The ink sticks to the inside of one rectangular picture cell so as to form an ink dot. The size of one picture cell is L1 in the main scan direction, and an ink recording area in the picture cells is changeable in the sub scan direction in a range from D to L2 so as to reproduce a half tone image.

Magenta (M) picture cells 15, cyan (C) picture cells 17 and a yellow (Y) picture cells 18 are formed of rectangular areas, each measuring L1×L2, as indicated in FIG. 1. The length L1 of each picture cell 15, 17 or 18 in the main scan direction corresponds to the length L1 of the heating elements in the main scan direction. The length L2 of each picture cell 15, 17 or 18 in the sub scan direction may be set at an appropriate value, but in the present embodiment L2=L1×2.

The magenta picture cells 15 that are alternating with blank picture cells the main scan direction are shifted by L2/2 (=L1 in the present embodiment) in the sub scan direction, in order to prevent creation of moire (e.g. parallel stripes). Magenta ink dots 16 are recorded within each picture cell 15 corresponding to the condition of energizing of each heating element. In FIG. 1, the magenta ink dots 16 are recorded at a dot percent of 50%, as indicated by the hatching. Two magenta picture cells 15 arranged adjacent in the main scan direction but shifted by L2/2 in the sub scan direction constitute one pattern. A plurality of such patterns are arranged in the main scan direction.

On the other hand, as for the cyan picture cells 17 and the yellow picture cells 18, every four cells arranged adjacent in the main scan direction constitute one pattern, and every adjacent two of the four cells are shifted from the other two cells by half the cell length L2/2, or L1, in the sub scan direction. A plurality of such patterns are arranged in the main scan direction. Cyan ink dots 19 and yellow ink dots 20 are recorded within each of the cyan and yellow picture cells 17 and 18, respectively, in correspondence with condition of energizing of each heating element. In FIG. 1, the cyan ink dots and the yellow ink dots 20 are recorded at a dot percent of 50%.

It is to be noted that the shift amount of the picture cells in the sub scan direction may not be limited to L2/2.

Figure 3A:
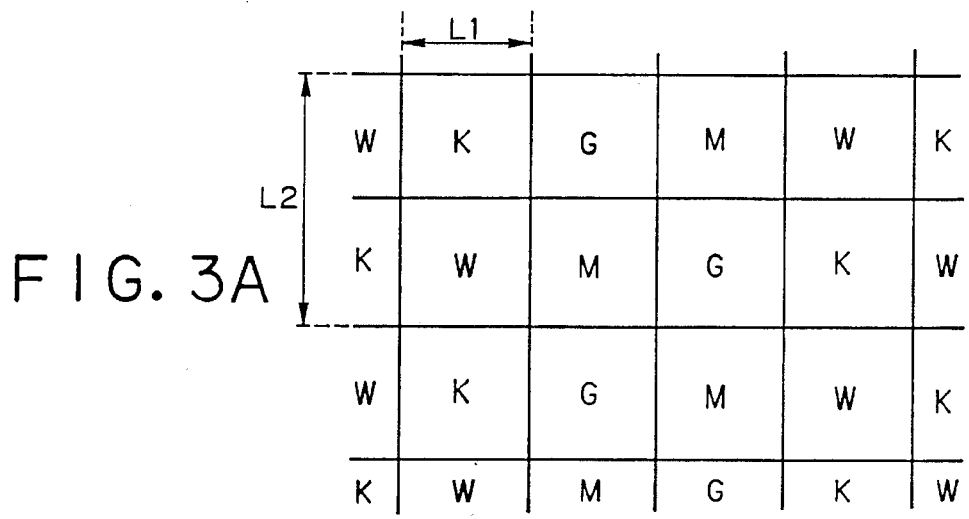
FIG. 3A is illustrative of a color pattern produced when gray is correctly printed in dot percent of 50% according to the embodiment of FIG. 1.

FIG. 3A illustrates a state in which a gray image is printed at a dot percentage of 50%, by superposing the three color components arranged as shown in FIG. 1. A first line as reproduced in extension in the main scan direction includes a series of black (K), green (G), magenta (M) and white (W) dots repeated in a cyclic fashion. A second line adjacent to the first line in the sub scan direction includes a series of W, M, G and K dots repeated in a cyclic fashion. The first and second lines are inverse in the order of the color cycle, and two colors arranged adjacent in the main scan direction are complementary colors of each other, such as G and M, and K and W.

Figure 3B:
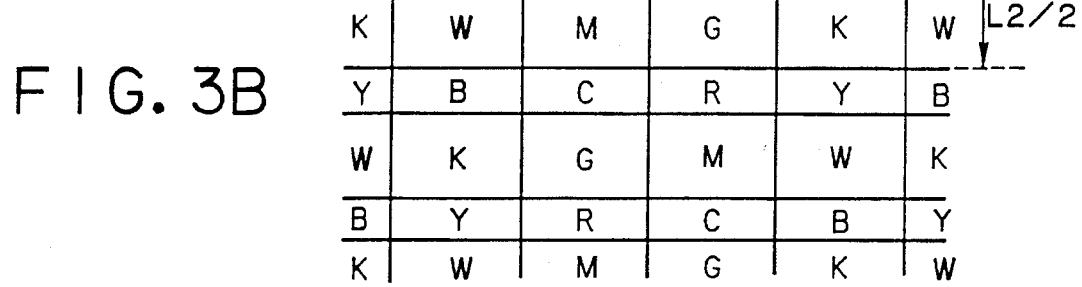
FIG. 3B is illustrative of a color pattern produced when the yellow image deviates in the sub scan direction relative to the color pattern of FIG. 3A.

FIG. 3B illustrates a state in which the registration of the yellow image is not right, such that all the yellow picture cells deviate by an amount L3 in the sub scan direction from the correct position. As a result, a color pattern of yellow (Y) Red (R), Cyan (C) and Blue (B) is provided in parts of the color pattern of K, G, M and W of the first line of FIG. 3A, and a color pattern of B, C, R and Y is provided in parts of the color pattern of W, M, G and K of the second line of FIG. 3A. The same color shearing occurs in the third and fourth lines of FIG. 3A as in the first and second lines. Each pair of adjacent colors in the main scan direction in these lines still comprise complementary colors, such as B and Y, R and C, and G and M. Thus, the image shown in FIG. 3B is visible to the human eyes macroscopically as gray. The same effect is applicable to the other lines.

Because the color patterns are too small to be resolved by the naked eyes of human beings, the reproduced colors, are discerned not according to individual recognition of minute ink dots but according to collective recognition of many ink dots. Thus, when the registration of the yellow image is incorrect, the relationship of complementary colors is maintained so that the general hue of the reproduced image is kept unchanged. Thus, there is no conspicuous irregularity in hue.

Figure 3C:
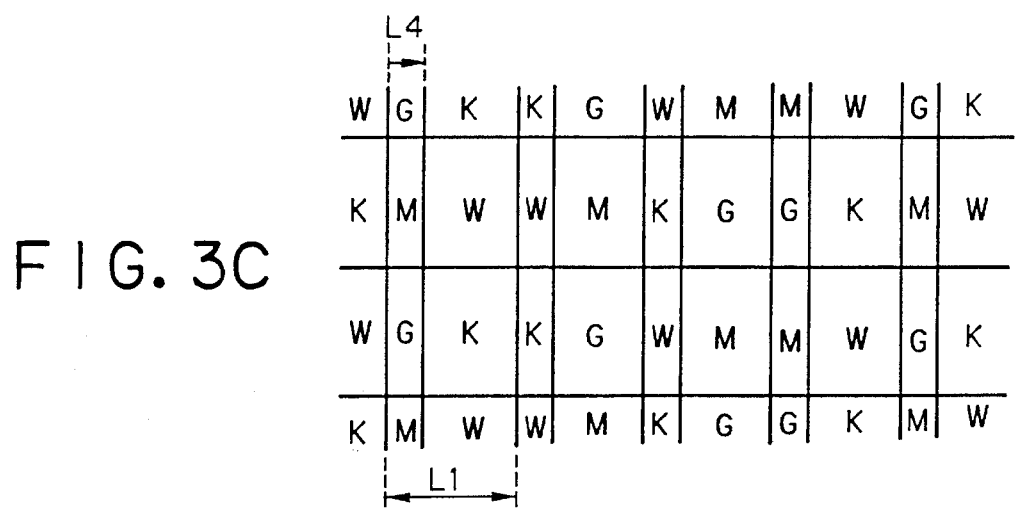
FIG. 3C is illustrative of a color pattern produced when the magenta image deviates in the main scan direction relative to the color pattern of FIG. 3A.

FIG. 3C illustrates a state in which the registration of the magenta image is incorrect in that all the magenta picture cells deviate by an amount L4 in the main scan direction from the correct position. In this case, although the reproduced colors are indeed microscopically changed, the relationship of complementary colors is maintained and thus the general hue of the reproduced image is kept unchanged for the naked eyes.

Figure 4:
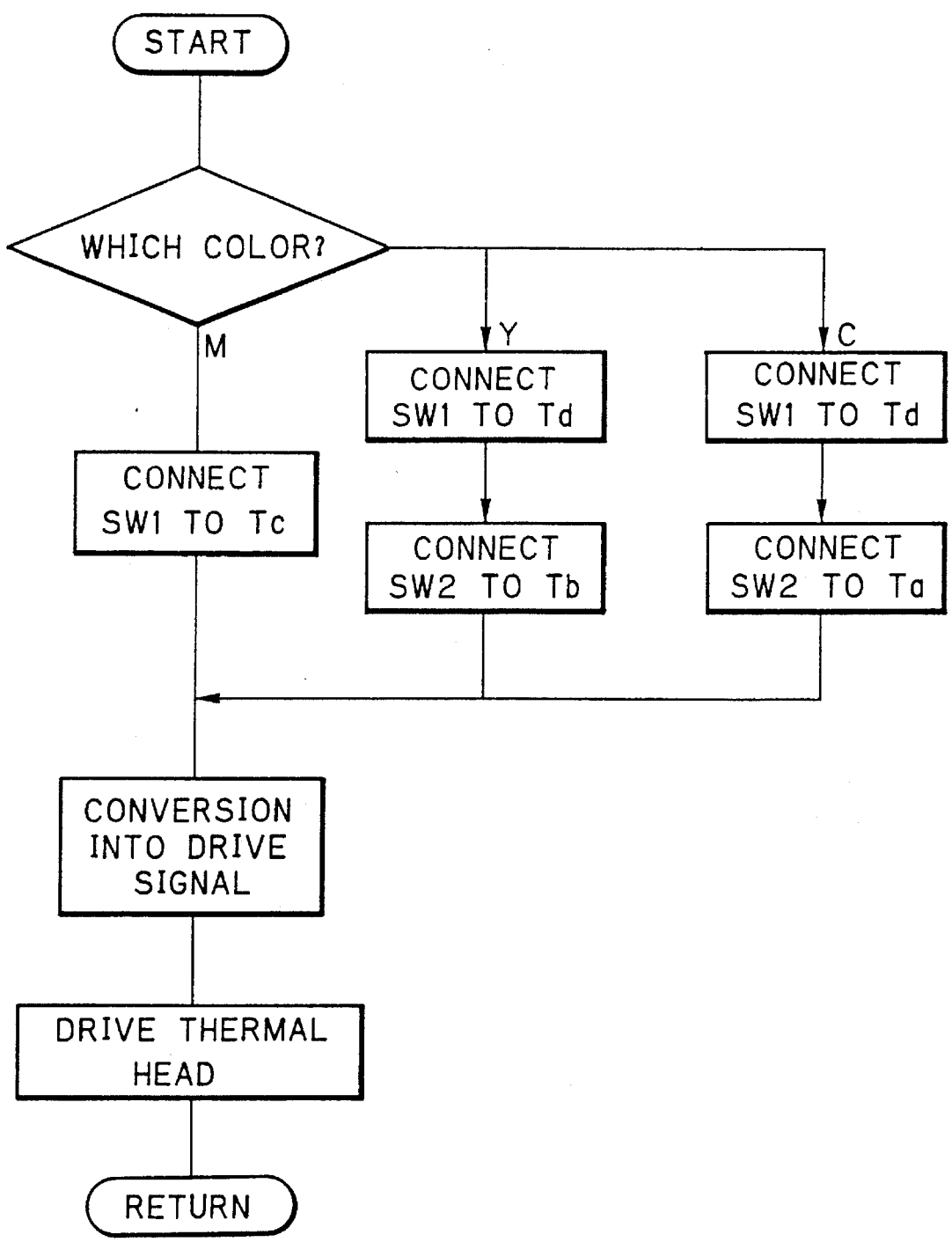
FIG. 4 is a flow chart illustrating the process of thermal recording in the thermal printer as illustrated in FIG. 2.

The operation of the above-described thermal wax transfer printing method will be described with reference to FIGS. 2 and 4. A green video signal is converted by a look-up table memory (LUT) 25 into a magenta drive signal.

For every second picture cell of one main scanning line, the LUT 25 generates the drive signal with a delay corresponding to the sub scanning amount of L2/2, relative to the drive signal for another picture cell. The drive signal has such a form that the size of the ink dots is changed in the range between D and L2 in the sub scan direction. The drive signal is sent to the thermal head 10, via a terminal Tc of a selector SW1.

A red video signal and a blue video signal are received selectively through a selector SW2, and sent to an LUT 26. The LUT 26 generates the drive signal such that every second picture cell group, consisting of two picture cells adjacent in the main scan direction, starts to be recorded with a delay corresponding to the sub scanning amount of L2/2 in the sub scan direction, relative to another picture cell group of two adjacent picture cells. The drive signals from the LUT 26 also have such a form that the size of the ink dots is changeable in the range between D and L2 in the sub scan direction. The drive signals from the LUT 26 are sent to the thermal head 10 through a terminal Td of the selector SW1.

The platen drum 11 rotates in the sub scan direction of the arrow while holding the recording paper 12. The ink film 13 is fed in the direction of its arrow until a beginning edge of the magenta ink area is positioned on the thermal head 10. The green video signal is converted by the LUT 26 into the magenta drive signal and sent to the thermal head 10 via the terminal Tc of the selector SW1. The thermal head 10 is driven according to the drive signal, applies heat and pressure to the rear of the ink film 13, and transfers the molten ink to the recording paper 12. The magenta ink dots 16 are recorded in the picture cells 15 in a manner where their sizes in the sub scan direction are changed according to the density to be recorded, and they are arranged zigzag or staggered relative to the main scan direction. While the platen drum 11 rotates, the magenta image is recorded onto the recording paper 12 line-by-line.

One revolution of the platen drum 11 having been made, the beginning edge of the recording paper 12 is returned to the position of starting the recording at the same time as the cyan ink area of the ink film 13 is set at the thermal head 10. The red video signal is sent through the terminal Ta of the selector SW2 and is converted by the LUT 26 into the cyan drive signal. The drive signal is sent through the terminal Td of the selector SW1 into the thermal head 10. The cyan ink dots 19 are recorded in the picture cells 17 as illustrated in FIG. 1, so that the cyan image is recorded line-by-line. While recording the cyan image, the cyan ink area is set at the thermal head 10.

To record the yellow image, the blue video signal is sent through the terminal Tb of the selector SW2, and is converted by the LUT 26 into the yellow drive signal. The drive signal is sent through the terminal Td of the selector SW1 into the thermal head 10. The yellow ink dots 20 are recorded in the picture cells 18, as illustrated in FIG. 1, so that the yellow image is recorded line-by-line. While recording the yellow image, the yellow ink area is set at the thermal head 10.

It is to be noted that the primary color, for which every second picture cell of the same main scanning line is staggered or offset, may not be limited to magenta but may be any one of the three primary colors. It is also possible to stagger every second picture cell of two of the three primary colors, while staggering the remaining one color by groups consisting of two adjacent picture cells of the same main scanning line. The same effect as set forth above can be obtained by these modifications.

Another embodiment of the invention will now be described with reference to FIGS. 5A, 5B, 6 and 7. In this embodiment, for one of the three primary colors (for instance, magenta), ink dots are recorded according to a first dot pattern wherein ink dots start to be recorded from a leading end to a trailing end of each odd picture cell with respect to the order of arrangement in a same main scanning line as shown in FIG. 5A. In FIG. 5A, G0 to G10 illustrate picture cells arranged in the main scan direction and having eleven density grades or tonal steps. Further each picture cell of the embodiment is constituted of ten sub-lines arranged in the sub scan direction, and ink dots are gradually recorded on the sub-lines in a number that is variable in accordance with a required tonal step.

On the other hand, in every even picture cell of the same main scanning line, ink dots are recorded according to a second dot pattern as shown in FIG. 5B wherein ink dots are also recorded on a variable number of ten sub-lines in each picture cell in accordance with a required one of the eleven tonal steps G0 to G10, but a starting position is placed at a half length of each even picture cell. Specifically, for reproducing the tonal step G1, an ink dot is recorded in a middle sub-line of the picture cell that is numbered with "1" in FIG. 5B, as is indicated by the hatching. With increase of the density or the tonal step, the number of ink dots increases to fill the sub-lines in the order of the numbering in FIG. 5b. that is, from the middle sub-line to a trailing sub-line with respect to the sub scan direction. Thus the trailing sub-line is numbered with "5" in FIG. 5B, and the condition where ink dots are filled in a trailing half area from the starting position to the trailing sub-line correspond to the tonal step G5. To reproduce the next higher density grade or the tonal step G6, another ink dot is disposed on a leading sub-line numbered with "6" in FIG. 5B, and thereafter ink dots are disposed onto the subsequent sub-lines until filling a sub-line numbered with "10". Of course, for the tonal step G0, no ink dot is recorded.

In the present embodiment, the starting position of ink dots of the second pattern is disposed at half the length of each picture cell in the sub scan direction. However the dot starting position of the second pattern may be disposed at different lengths such as for example, at one third, two thirds, three fourths, three fifths of the length of the picture cells in the sub scan direction.

Figure 6:
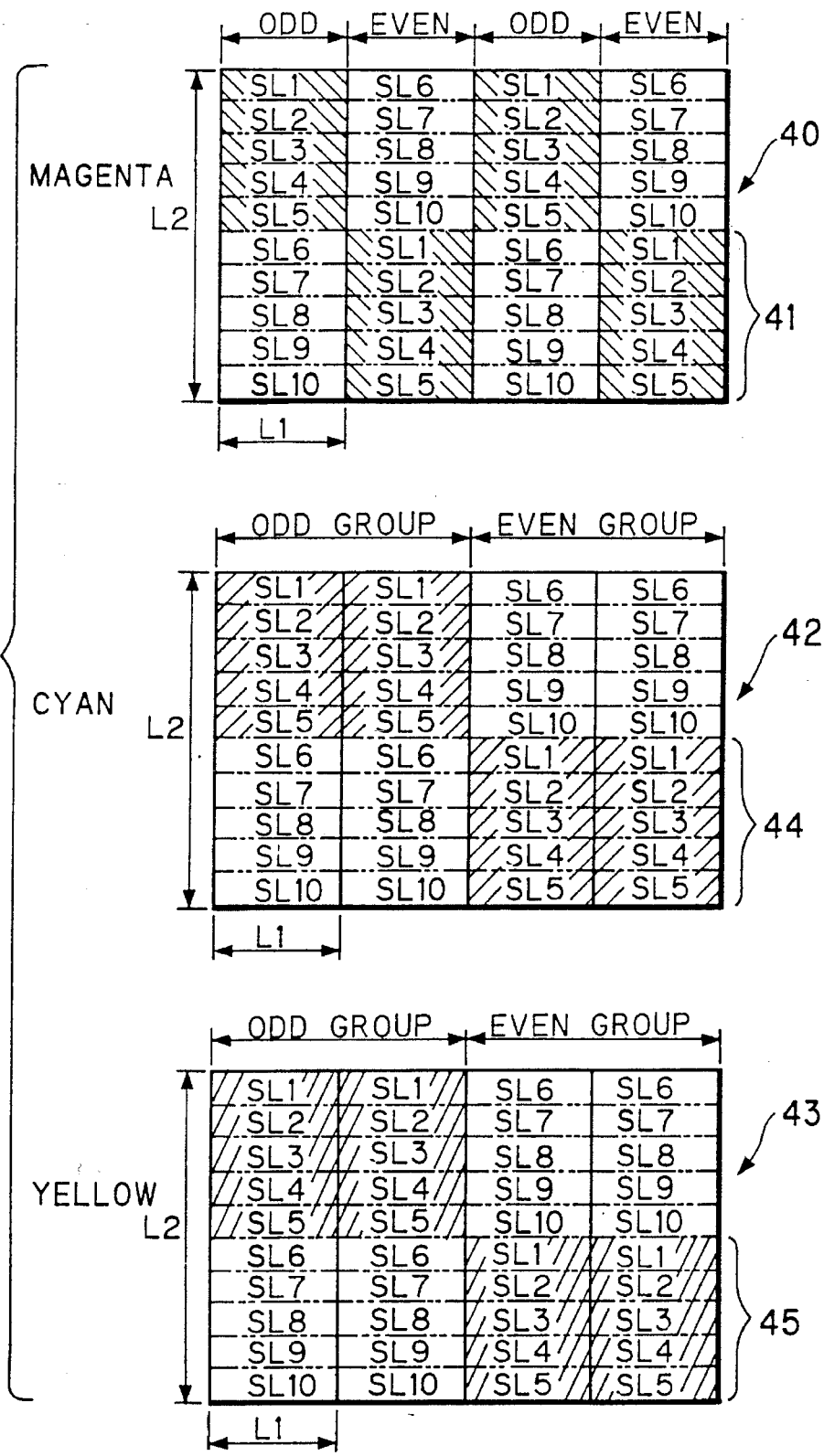
FIG. 6 illustrates states of recording ink dots in cyan, magenta and yellow picture cells at a dot percent of 50% according to the second embodiment as illustrated in FIGS. 5A and 5B.

FIG. 6 shows three color images recorded at a dot percent of 50% in above-described manner using the first and second dot patterns. Specifically, as for magenta picture cells 40, ink dots 41 indicated by the hatching are recorded in the leading half area of each odd picture cell, and in the trailing half area of each even picture cell with respect to the sub scan direction. As for cyan and yellow picture cells 42 and 43, ink dots 44 and 45 are recorded in the leading half areas of the two picture cells of each odd picture cell group, and in the trailing half areas of the two picture cells of each even picture cell group.

By superposing the three color images shown in FIG. 6, a gray image having the same color patterns as shown in FIG. 3A is provided. Therefore, the same effect as that of the first embodiment can be obtained in the second embodiment. Namely, even if color registration failure occurs in the main scan direction as well as in the sub scan direction, the colors are only microscopically changed and accompanied with a maintenance in the relationship of complementary colors, so that the general hue of the reproduced image is kept unchanged to the naked eye. Thus there is no conspicuous irregularity in hue.

Since the ink dots of each color are scattered appropriately, fewer ink dots occur in a line along the main scan direction, so that moire (patterns of parallel lines) is reduced to the minimum. Moreover, because the picture cells are not staggered relative to the main scan direction, resolution is improved compared with the first embodiment.

Figure 7:
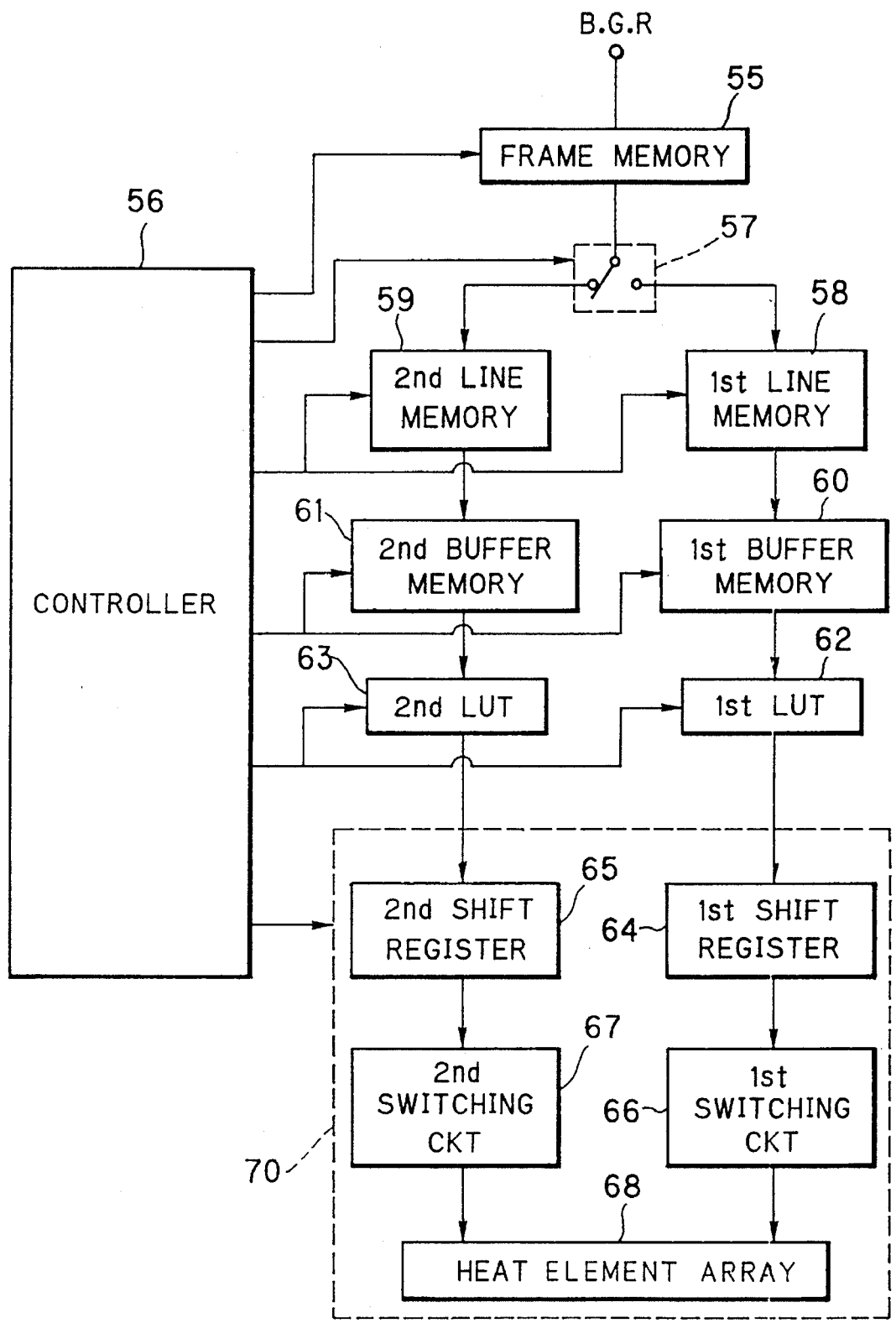
FIG. 7 is a schematic view illustrating a thermal printer for practicing the second embodiment.

FIG. 7 shows an example of a head driver for driving an array of heating elements so as to record ink dots according to the dot patterns as described with reference to FIGS. 5A and 5B. Image signals of three primary colors B, G and R, which are inputted through a video recorder or a scanner, are written in a frame memory 55 for each color. When recording an image, a controller 56 reads the image signal representing gradation level of each color image from the frame memory 55 line-by-line. In the case of reading the green (G) image signal, the controller 56 actuates a selector 57 to sort or separate data of odd picture cells from data of even picture cells in the order of arrangement in a main scanning line, so as to send the odd picture cell data to a first line memory 58 and send the even picture cell data to a second line memory 59.

As for the blue (B) and red (R) image signals, the controller 56 actuates the selector 57 to sort data of odd picture cell groups from data of even picture cell groups, each of the groups consisting of two adjacent picture cells of a main scanning line. Thereby, the data of the odd picture cell groups of the blue or red image signal is sent to the first line memory 58, whereas the data of the even picture cell groups of the blue or red image signal is sent to the second line memory 59. The data written in the line memories 58 and 59 is transferred to buffer memories 60 and 61, and then to first and second LUTs 62 and 63, respectively. The first LUT 62 generates drive signals for recording magenta ink dots according to the first dot pattern shown in FIG. 5A, on the basis of the odd picture cell data of a line of the green image signal. The first LUT 62 also generates drive signals for recording yellow or cyan picture cells according to the first dot pattern on the basis of the data of the odd picture cell groups of a line of the blue or red image signal. On the other hand, the second LUT 63 generates drive signals for recording ink dots according to the second dot pattern shown in FIG. 5B in even picture cells of magenta and in the even picture cell groups of yellow and cyan.

The drive signals of one line of picture cells are sent from the first and second LUTs 62 and 63 to first and second shift registers 64 and 65, respectively, in a sequence from one sub-line to another and in the form of a serial signal each. The first and second shift registers 64 and 65 convert the serial signals to parallel signals and send the parallel signal to first and second switching circuit 66 and 67, respectively. When recording magenta ink dots, the first switching circuit 66 controls energizing of odd heating elements of the heat element array 68, while the second switching circuit 67 controls energizing of even heating elements of the array 68. When recording yellow or cyan ink dots, the first switching circuit 66 controls every second group of two adjacent heating elements, that correspond to each of the odd picture cell groups of one line, while the second switching circuit 67 controls another group of the heating elements that corresponds to each of the even picture cell groups of one line.

For example, for the tonal step G8, the first switching circuit 66 activates the associated heating elements to record ink dots in a time sequence from the leading sub-line to the eighth sub-line in the order of arrangement in the sub scan direction during the sub scanning of one picture cell. Simultaneously, the second switching circuit 67 activates the associated heating elements to record ink dots in a time sequence from the leading sub-line to the third sub-line and then from the middle sub-line, that is the sixth sub-line in the order of arrangement in the sub scan direction and numbered with "1" in FIG. 5B, to the trailing sub-line. In this case, no ink dot is recorded in the fourth and fifth sub-lines of the corresponding even picture cells or even picture cell groups.

When the image of one color has been recorded line-by-line in the above-described manner, the image of another color starts to be recorded in the similar manner as discussed above.

Figure 8:
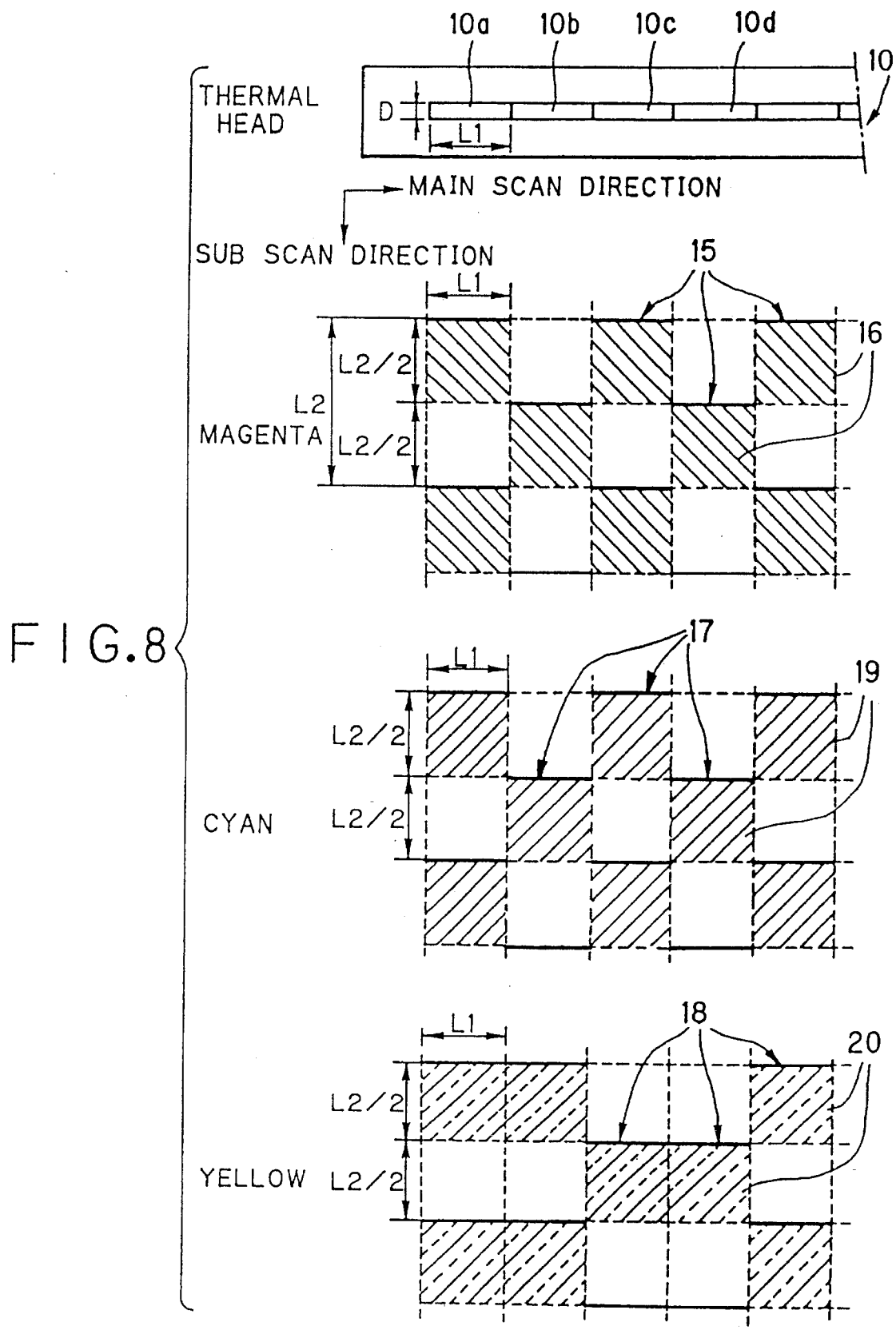
FIG. 8 illustrates a thermal head and states of recording ink dots in cyan, magenta and yellow picture cells at a dot percent of 50% according to an alternative embodiment of the invention.

Also in this embodiment, the same effect as set forth above can be obtained when every odd picture cell of the same main scanning line of cyan or yellow has ink dots recorded according to the first dot pattern, whereas every even picture cell of the same main scanning line of cyan or yellow has ink dots recorded according to the second dot pattern, and simultaneously every odd picture cell group consisting of adjacent two picture cells of the same main scanning lines of the other two colors has ink dots recorded according to the first dot pattern, whereas every even picture cell group of these two colors has ink dots recorded according to the second dot pattern. As shown in FIG. 8, it is also possible to use the first dot pattern for every odd picture cell and the second dot pattern for every even picture cell of the same scanning line of two of the three colors, while using the first dot pattern for every odd group and the second dot pattern for every even group, each group consisting of two adjacent picture cells of the same main scanning line of another of the three colors.

Although the present invention has been described with respect to the recording of a full-color image with three primary colors, it is possible to apply the present invention to recording color images containing black images besides the three color images.

Furthermore, the present invention is applicable not only to the wax transfer type thermal printing method but also to the sublimation type and the direct thermal printing methods, the ink jet printing method, the electrophotographic recording method, and so forth.

The present invention is also applicable to serial printers wherein picture cells are serially printed by a two-dimensional movement of a recording medium relative to a recording head, although the above embodiments only relate to line printers wherein a recording medium is moved linearly relative to a recording head.

Thus, the present invention is not intended to be limited by the above described embodiments but, on the contrary, various modifications of the present invention can be effected without departing from the spirit and scope of the appended claims.

What is claimed is:

1. A method of recording a half tone color image onto a recording material with ink dots of at least three primary colors including yellow, magenta and cyan, comprising the steps of:

recording said ink dots in picture cells by a recording head having an array of recording elements arranged along a main scan direction, a recording area of said ink dots within each picture cell being variable in a sub scan direction orthogonal to said main scan direction in accordance with the density of each picture cell, each of said recording elements being associated with one picture cell of each main scanning line extending in said main scan direction;

staggering every second picture cell of a same main scanning line of one of said three primary colors by a predetermined amount in said sub scan direction;

dividing said picture cells of the other two of said three primary colors into groups which each comprise two adjacent picture cells of a same main scanning line; and staggering every second one of said groups of the same main scanning line of the other two primary colors by said predetermined amount in said sub scan direction.

2. A method as recited in claim 1, wherein said picture cells of said three primary colors have a same size, and said predetermined amount of said staggering corresponds to a half length of said picture cells in said sub scan direction.

3. A method as recited in claim 1, wherein said recording elements comprise heating elements for heating a back of an ink film so as to transfer said ink dots to said recording material.

4. A method as recited in claim 1, wherein said recording material is supported on a drum so as to be advanced in said sub scan direction relative to said recording head.

5. A method of recording a half tone color image onto a recording material with ink dots of at least three primary colors including yellow, magenta and cyan, comprising the steps of:

recording said ink dots in picture cells by a recording head having an array of recording elements arranged along a main scan direction, a recording area of said ink dots within each picture cell being variable in a sub scan direction orthogonal to said main scan direction in accordance with the density of each picture cell, each of said recording elements being associated with one picture cell of each main scanning line extending in said main scan direction;

staggering every second picture cell of a same main scanning line of two of said three primary colors by a predetermined amount in said sub scan direction;

dividing said picture cells of the remaining one of said three primary colors into groups which each comprise two adjacent picture cells of a same main scanning line; and staggering every second one of said groups of the same main scanning line of the remaining one primary color by said predetermined amount in said sub scan direction.

6. A method as recited in claim 5, wherein said picture cells of said three primary colors have a same size, and said predetermined amount of said staggering corresponds to a half length of said picture cells in said sub scan direction.

7. A method as recited in claim 5, wherein said recording elements comprise heating elements for heating a back of an ink film so as to transfer said ink dots to said recording material.

8. A method as recited in claim 5, wherein said recording material is supported on a drum so as to be advanced in said sub scan direction relative to said recording head.

9. A method of recording a half tone color image onto a recording material with ink dots of at least three primary colors including yellow, magenta and cyan, comprising the steps of:

recording the half tone color image by a recording head having an array of recording elements arranged along a main scan direction, each of said recording elements being associated with a picture cell of each main scanning line extending in said main scan direction, a number of said ink dots being recorded within said picture cell and arranged in a sub scan direction orthogonal to said main scan direction, said number of said ink dots being variable in accordance with the density of said picture cell;

dividing said picture cells of one of said three primary colors into odd cells and even cells with respect to the order of arrangement in a same main scanning line;

recording said ink dots of said one color in said odd cells according to a first dot pattern wherein ink dots start to be recorded from a leading end to a trailing end of each of said picture cells with respect to said sub scan direction;

recording said ink dots of said one color in said even cells according to a second dot pattern wherein a first ink dot is recorded in a predetermined starting position placed in an intermediate portion between said leading and trailing ends of each picture cell, and a second ink dot and the following ink dots gradually take up a trailing half area of said picture cell behind said starting position with an increase in the density of said picture cell until reaching said trailing end, and an ink dot, which is allocated to a picture cell with a higher density than a picture cell density reproduced by the ink dots fulfilled in said trailing half area, is recorded in said leading end, and subsequent ink dots gradually take up a leading half area of said picture cell with an increase in the density of said picture cell until reaching said starting position;

dividing said picture cells of the other two of said three primary colors into groups which each comprise two adjacent picture cells of a same scanning line;

recording said ink dots of the other two primary colors according to said first dot pattern in odd groups of said groups with respect to the order of arrangement in the same main scanning line; and recording said ink dots of the other two primary colors according to said second dot pattern in even groups of said groups.

10. A method as recited in claim 9, wherein said picture cells of said three primary colors have a same size, and said predetermined starting position for said first ink dot is disposed a half length of said picture cells in said sub scan direction.

11. A method as recited in claim 9, wherein said leading ends of said picture cells of the same main scanning line are disposed in the same position relative to said sub scan direction for all said three primary colors.

12. A method as recited in claim 9, wherein said recording elements comprise heating elements for heating a back of an ink film so as to transfer said ink dots to said recording material.

13. A method as recited in claim 9, wherein said recording material is supported on a drum so as to be advanced in said sub scan direction relative to said recording head.

14. A method of recording a half tone color image onto a recording material with ink dots of at least three primary colors including yellow, magenta and cyan, comprising the steps of:

recording the half tone color image by a recording head having an array of recording elements arranged along a main scan direction, each of said recording elements being associated with a picture cell of each main scanning line extending in said main scan direction, a number of said ink dots being recorded within said picture cell and arranged in a sub scan direction orthogonal to said main scan direction, said number of said ink dots being variable in accordance with the density of said picture cell;

dividing said picture cells of two of said three primary colors into odd cells and even cells with respect to the order of arrangement in a same main scanning line;

recording said ink dots of said two colors in said odd cells according to a first dot pattern wherein ink dots start to be recorded from a leading end to a trailing end of each of said picture cells with respect to said sub scan direction;

recording said ink dots of said two colors in said even cells according to a second dot pattern wherein a first ink dot is recorded in a predetermined starting position placed in an intermediate portion between said leading and trailing ends of each picture cell, and a second ink dot and the following ink dots gradually take up a trailing half area of said picture cell behind said starting position with an increase in the density of said picture cell until reaching said trailing end, and an ink dot, which is allocated to a picture cell density one grade higher than a picture cell density reproduced by the ink dots fulfilled in said trailing half area, is recorded in said leading end, and subsequent ink dots gradually take up a leading half area of said picture cell with an increase in the density of said picture cell until reaching said starting position;

dividing said picture cells of the remaining one of said three primary colors into groups which each comprise two adjacent picture cells of a same scanning line;

recording said ink dots of the one primary color according to said first dot pattern in odd groups of said groups with respect to the order of arrangement in the same main scanning line; and recording said ink dots of the one primary color according to said second dot pattern in even groups of said groups.

15. A method as recited in claim 14, wherein said picture cells of said three primary colors have a same size, and said predetermined starting position for said first ink dot is disposed a half length of said picture cells in said sub scan direction.

16. A method as recited in claim 14, wherein said leading ends of said picture cells of the same main scanning line are disposed in the same position relative to said sub scan direction for all said three primary colors.

17. A method as recited in claim 14, wherein said recording elements comprise heating elements for heating a back of an ink film so as to transfer said ink dots to said recording material.

18. A method as recited in claim 14, wherein said recording material is supported on a drum so as to be advanced in said sub scan direction relative to said recording head.

19. An apparatus for recording a half tone color image onto a recording material with ink dots of at least three primary colors including yellow, magenta and cyan, comprising:

a recording head having an array of recording elements arranged along a main scan direction for recording said ink dots in picture cells, an area of said ink dots within each picture cell being variable in a sub scan direction orthogonal to said main scan direction in accordance with the density of each picture cell, each of said recording elements being associated with one picture cell of each main scanning line extending in said main scan direction;

first means for staggering every second picture cell of a same main scanning line by a predetermined amount in said sub scan direction;

second means for dividing said picture cells into groups which each comprise two adjacent picture cells of a same main scanning line; and third means for staggering every second one of said groups of the same main scanning line by said predetermined amount in said sub scan direction in cooperation with said second means.

20. An apparatus as recited in claim 19, wherein said recording elements comprise heating elements for heating a back of an ink film so as to transfer said ink dots to said recording material.

21. A method as recited in claim 19, wherein said recording material is supported on a drum so as to be advanced in said sub scan direction relative to said recording head.

22. An apparatus as recited in claim 19, wherein said first means staggers every second picture cell of one of said three primary colors, and said second means divides said picture cells of the other two of said three primary colors into said groups so that said third means staggers every second said group of the other two primary colors.

23. An apparatus as recited in claim 19, wherein said first means staggers every second picture cell of two of said three primary colors, and said second means divides said picture cells of the remaining one of said three primary colors into said groups so that said third means staggers every second said group of the remaining one primary color.

24. An apparatus for recording a half tone color image onto a recording material with ink dots of at least three primary colors including yellow, magenta and cyan, comprising:

a recording head having an array of recording elements arranged along a main scan direction for recording the half tone color image, each of said recording elements being associated with a picture cell of each main scanning line extending in said main scan direction, a number of said ink dots being recorded within said picture cell and arranged in a sub scan direction orthogonal to said main scan direction, said number of said ink dots being variable in accordance with the density of each picture cell;

first means for dividing said picture cells of one of said three primary colors into odd cells and even cells with respect to the order of arrangement in a same main scanning line;

second means for dividing said picture cells of the other two of said three primary colors into groups which each comprise two adjacent picture cells of a same main scanning line and further dividing said groups into odd groups and even groups with respect to the order of arrangement in said same main scanning line;

third means for activating said recording elements to record said ink dots in said odd cells or in said odd groups according to a first dot pattern wherein ink dots start to be recorded from a leading end to a trailing end of each picture of said cells with respect to said sub scan direction; and fourth means for activating said recording elements to record said ink dots in said even cells or in said even groups according to a second dot pattern wherein a first ink dot is recorded in a predetermined starting position placed in an intermediate portion between said leading and trailing ends of each picture cell, and a second ink dot and the following ink dots gradually take up a trailing half area of said picture cell behind said starting position with an increase in the density of said picture cell until reaching said trailing end, and an ink dot, which is allocated to a picture cell with a higher density than a picture cell density of said picture cell density reproduced by the ink dots fulfilled in said trailing half area, is recorded in said leading end and subsequent ink dots gradually take up a leading half area of said picture cell with an increase in the density of said picture cell until reaching said starting position.

25. An apparatus as recited in claim 24, wherein said recording elements comprise heating elements for heating a back of an ink film so as to transfer said ink dots to said recording material.

26. An apparatus as recited in claim 24, wherein said recording material is supported on a drum so as to be advanced in said sub scan direction relative to said recording head.

27. An apparatus for recording a half tone color image onto a recording material with ink dots of at least three primary colors including yellow, magenta and cyan, comprising:

a recording head having an array of recording elements arranged along a main scan direction for recording the half tone color image, each of said recording elements being associated with a picture cell of each main scanning line extending in said main scan direction, a number of said ink dots being recorded within said picture cell and arranged in a sub scan direction orthogonal to said main scan direction, said number of said ink dots being variable in accordance with the density of each picture cell;

first means for dividing said picture cells of two of said three primary colors into odd cells and even cells with respect to the order of arrangement in a same main scanning line;

second means for dividing said picture cells of the remaining one of said three primary colors into groups which each comprise two adjacent picture cells of a same scanning line and further dividing said groups into odd groups and even groups with respect to the order of arrangement in said same main scanning line;

third means for activating said recording elements to record said ink dots in said odd cells or in said odd groups according to a first dot pattern wherein ink dots start to be recorded from a leading end to a trailing end of each picture cell with respect to said sub scan direction; and fourth means for activating said recording elements to record said ink dots in said even cells or in said even groups according to a second dot pattern wherein a first ink dot is recorded in a predetermined starting position placed in an intermediate portion between said leading and trailing ends of each picture cell, and a second ink dot and the following ink dots gradually take up a trailing half area of said picture cell behind said starting position with an increase in the density of said picture cell until reaching said trailing end, and an ink dot, which is allocated to a picture cell with a higher density than a picture cell density reproduced by the ink dots fulfilled in said trailing half area, is recorded in said leading end, and subsequent ink dots gradually take up a leading half area of said picture cell with an increase in the density of said picture cell until reaching said starting position.

28. An apparatus as recited in claim 27, wherein said recording elements comprise heating elements for heating a back of an ink film so as to transfer said ink dots to said recording material.

29. An apparatus as recited in claim 27, wherein said recording material is supported on a drum so as to be advanced in said sub scan direction relative to said recording head.

* * * * *